United States Patent
Yuan et al.

(10) Patent No.: US 10,928,633 B1
(45) Date of Patent: Feb. 23, 2021

(54) APPARATUSES, METHODS AND SYSTEMS FOR AN OFF-AXIS DISPLAY ASSEMBLY

(71) Applicant: Meta View, Inc., San Mateo, CA (US)

(72) Inventors: Sheng Yuan, Santa Jose, CA (US); Jie Xiang, Cupertino, CA (US); Ashish Ahuja, Mountain View, CA (US)

(73) Assignee: Meta View, Inc., San Mateo, CA (US)

( * ) Notice: Subject to any disclaimer, the term of this patent is extended or adjusted under 35 U.S.C. 154(b) by 19 days.

(21) Appl. No.: 15/990,577

(22) Filed: May 25, 2018

Related U.S. Application Data

(60) Provisional application No. 62/511,954, filed on May 26, 2017.

(51) Int. Cl.
    *G02B 27/01* (2006.01)

(52) U.S. Cl.
    CPC .................. *G02B 27/0172* (2013.01)

(58) Field of Classification Search
    CPC ...... G02B 27/01272; G02B 2027/0178; G02B 2027/011; G02B 27/0101; G02B 2027/0174; G02B 5/30; G02B 3/0056; G02B 5/32; G02B 2027/0116; G02B 2027/0118; G02B 2027/0125; G02B 2027/0132; G02B 2027/012; G02B 2027/0123; G02B 2027/0134; G02B 27/1066; G02B 27/4211; G02B 30/35; G02B 2027/0154; G02B 6/0038; G02B 6/0016; G02B 6/0053; G02B 6/001; G02B 6/002; G02B 6/0021; G02B 6/0023; G02B 6/0025; G02B 6/0031; G02B 6/0046; G02B 6/0051; G02B 6/0055; G02B 6/0056; G02B 6/4298; G02B 2027/0127; G02B 2027/0112; G02B 2027/0141; G02B 2027/0187; G02B 2027/0181; G02B 2027/0185; G02B 2027/0114; G02B 2027/0121; G02B 2027/015; G02B 2027/0107; G02B 2027/0159; G02B 2027/0194; G02B 2027/0145; G02B 27/0081; G02B 27/01; G02B 27/141; G02B 27/0093; G02B 27/283; G02B 27/0075; G02B 27/017; G02B 27/0961; G02B 27/0149; G02B 27/1006; G02B 27/0179; G02B 27/026; G02B 27/0977; G02B 27/1073; G02B 27/4205; G02B 27/425; G02B 27/48; G02B 27/0176; G02B 27/286; G02B 27/4272; G02B 27/0018; G02B 27/0103; G02B 27/0905; G02B 27/0988; G02B 27/00; G02B 27/0068; G02B 27/09; G02B 27/0911; G02B 27/0972; G02B 27/1026; G02B 27/108; G02B 27/30; G02B 5/3025; G02B 5/09; G02B 5/0257; G02B 5/1819; G02B 5/3083; G02B 5/0231; G02B 5/0294; G02B 5/045; G02B 5/12;

(Continued)

(56) References Cited

U.S. PATENT DOCUMENTS

2014/0361957 A1 * 12/2014 Hua .................. G06F 3/013
                                                       345/8
2018/0095281 A1 * 4/2018 Takeda .............. G02B 27/4211

* cited by examiner

*Primary Examiner* — Brandi N Thomas
(74) *Attorney, Agent, or Firm* — Andrew Bodendorf

(57) ABSTRACT

Aspects of the disclosed apparatuses, methods, and systems provide arrangement of the visual components of an augmented or virtual display system with optimized telecentricity, focal depth, and wide FOV. The visual components may include a light source and a corresponding optical element.

19 Claims, 9 Drawing Sheets

(58) Field of Classification Search
CPC ............... G02B 5/0215; G02B 26/008; G02B 26/0875; G02B 26/0883; G02B 26/10; G02B 26/106; G02B 26/0833; G02B 26/0841; G02B 26/085; G02B 26/103; G02B 26/105; G02B 26/126; G02B 26/129; G02B 5/0273; G02B 5/0278; G02B 5/18; G02B 5/1842; G02B 5/208; G02B 5/26; G02B 5/3016; G02B 30/27; G02B 3/0043; G02B 30/24; G02B 6/0015; G02B 6/0026; G02B 6/0035; G02B 6/0045; G02B 6/0065; G02B 6/3889; G02B 6/00; G02B 6/0011; G02B 6/0036; G02B 6/0076; G02B 3/08; G02B 3/14; G02B 3/00; G02B 7/021; G02B 7/09; G02B 7/28; G02B 23/14; G02B 23/2461; G02B 23/2484; G02F 1/133536; G02F 1/13362; G02F 2001/13355; G02F 1/133528; G02F 2001/133541; G02F 1/1334; G02F 1/133555; G02F 1/1336; G02F 1/133605; G02F 1/13718; G02F 2001/133538; G02F 2001/133543; G02F 2001/133557; G02F 2001/133622; G02F 2001/133638; G02F 2201/34; G02F 1/133; G02F 1/133504; G02F 1/133603; G02F 1/133606; G02F 1/133611; G02F 1/13725; G02F 1/29; G02F 2001/294; G02F 2203/07
USPC .................................................. 359/609–630
See application file for complete search history.

APPARATUSES, METHODS AND SYSTEMS FOR AN OFF-AXIS DISPLAY ASSEMBLY

CROSS-REFERENCE TO RELATED APPLICATIONS

This application claims the benefit under 35 U.S.C. § 119(e) of U.S. Provisional Application No. 62/511,954, titled "APPARATUSES, METHODS AND SYSTEMS FOR AN OFF-AXIS DISPLAY ASSEMBLY" filed on May 26, 2017, in the U.S. Patent and Trademark Office, which is herein expressly incorporated by reference in its entirety for all purposes.

BACKGROUND

The interest in wearable technology has grown considerably over the last decade. For example, wearable virtual reality (VR) displays present virtual images to the user to provide a virtual environment. Now augmented reality (AR) displays are being developed that may be worn by a user to present the user with a synthetic image overlaying a direct view of the environment. Both VR and AR displays can present virtual digital content to a user. VR or AR display systems allow a user to perceive and interact with the virtual content within a perceived three-dimensional (3-D) virtual space. However, technical challenges exist as to how to arrange components of an off-axis display system to provide the user with an optimal VR and/or AR experience.

SUMMARY

Aspects of the disclosed apparatuses, methods, and systems describe various methods, system, components, and techniques that provide an off-axis display system. In one general aspect, the visual components of a display system are arranged to provide optimized telecentricity, focal depth, and wide field of view (FOV). The visual components may include a light source and a corresponding optical element. An angle of tilt of the light source, the angle of tilt of the optical element, and shape of a reflective surface may be specified to maximize telecentricity of the light reflected by the optical element to the user's eyes. In another general aspect, the display system provides a flat focal plane at a desired focal range.

In one general aspect, an off-axis vision display system includes at least one light source emitting light titled at a first angle $\theta_1$ relative to the optical axis of the display system; and at least one optical element tilted at a second angle $\theta_2$ relative to the optical axis having a specified shape C and arranged relative to the light source to reflect the emitted light at a corresponding eye of user of the vision display system, where the reflected light is perceived by the user as a virtual image located in a focal plane, wherein the first angle $\theta_1$, the second angle $\theta2_2$, and the shape C are selected to provide substantially telecentric light for viewing by the user.

The light source may include a plurality of point sources of light configured to provide an image, each point source emitting ray bundles including a center ray, wherein only the ray bundles emitted from the light source whose center rays are substantially parallel to each other are reflected by the optical element and viewed by the user. The image may be perceived by a user of the vision display system as a virtual object within the focal plane. The focal plane may provide a virtual image that is perceived to appear at focal distances greater than 0.4 meters and less than 1.1 meters.

The vision system may include two light sources and two optical elements wherein a light source is paired with a corresponding optical element, and each pair are positioned by the system corresponding to an eye of a user to provide substantially telecentric light for viewing by the user. Each light source may be a 2-D panel display and each optical element may be located on a portion of an interior surface of a visor of the vision display system.

The shape C of the surface may be one of bi-conic, bi-conic Zernike, extended polynomial, or freeform.

The vision display system may be a virtual reality headset configured to be worn on the head of a user.

The vision display system also may be an augmented reality headset configured to be worn on the head of a user.

The details of various embodiments are set forth in the accompanying drawings and the description below. Other features and advantages will be apparent from the following description, the drawings, and the claims.

BRIEF DESCRIPTION OF THE DRAWINGS

The following description illustrates aspects of embodiments of the disclosed apparatuses, methods, and systems in more detail, by way of examples, which are intended to be non-limiting and illustrative with reference to the accompanying drawings, in which.

DETAILED DESCRIPTION

The human perceptual system can combine various sensory cues in an efficient manner to perceive "physically plausible" virtual content in a real-world environment. For example, the human perceptual system can integrate, among other things, sensory cues, such as one or more of luminance, depth, and/or shape information to form or perceive coherent virtual content. Virtual content may include one or more virtual objects, and/or other content. As a result, the properties of the human perception may be exploited through visual systems, as described herein, employing hardware, and/or software architectures to form virtual content that may be located and/or perceived to be located in the real-world environment by virtue of the principles of the depth sensitive modules of the human brain. In addition, binocular or stereographic vision display systems provide two offset images separately to the left and right eye of the viewer. These two-dimensional images are then combined in the brain of the viewer to give the perception of 3D depth. An augmented reality environment may include the views of the images of virtual content within a virtual environment superimposed over the views of the real-world environment. A virtual reality environment may include views of virtual content within a virtual environment alone.

Figure 1:
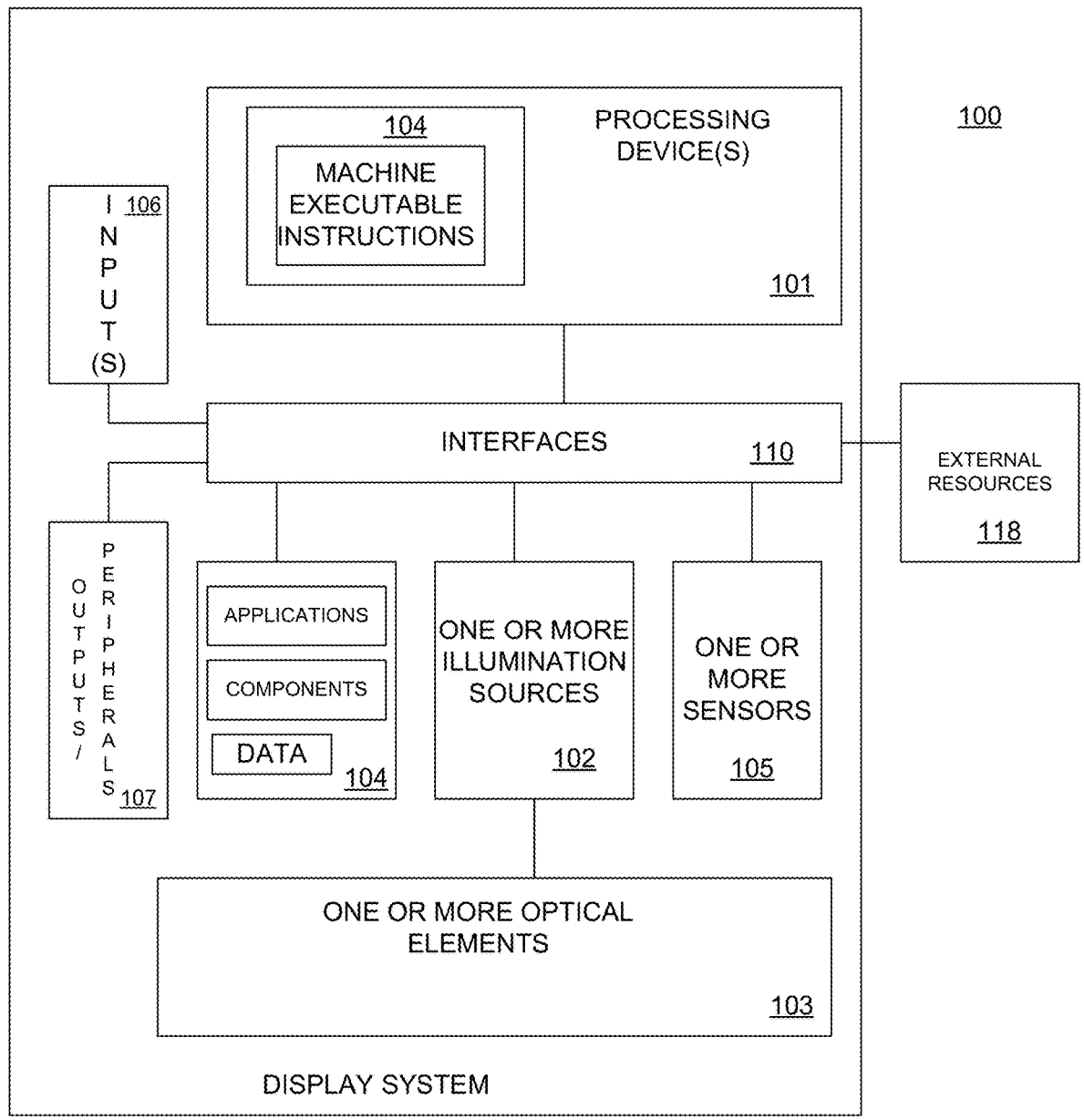
FIG. 1 shows a block diagram of an example of a display system.
Figure 8:
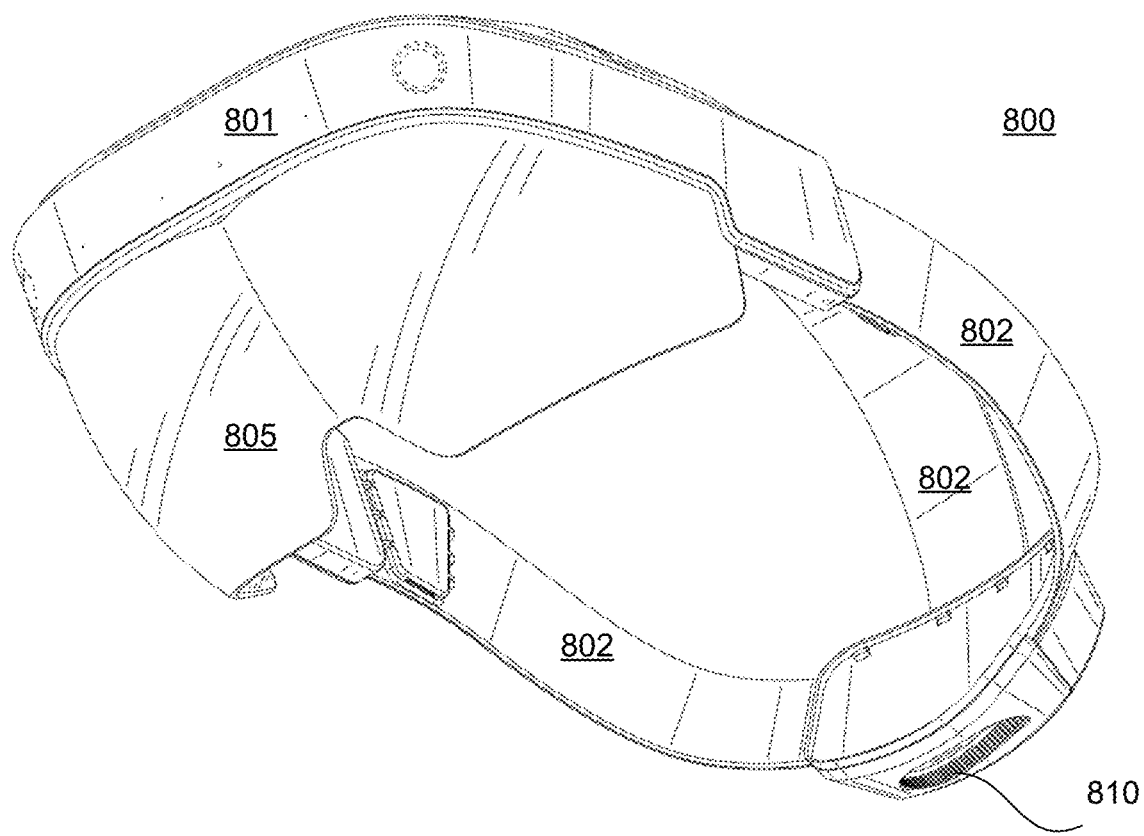
FIG. 8 shows an example of a head mounted display system incorporating the visual components of the off-axis visual system.

FIG. 1 shows an example of a display system 100 configured to provide an interactive environment, such as one or more of an augmented reality environment and/or a virtual reality environment. The display system 100 may include one or more of: one or more physical processing devices 101; one or more light sources 102; one or more optical elements 103; one or more physical storage devices 104; one or more sensors 105, input devices 106, output devices 107, and interfaces 110, external resources 118, and/or other components (not shown). In some implementations, one or more components of system 100 may be included with and/or otherwise embodied within a headset. The headset may be configured to be installed (e.g., worn) on a head of a user. For example, the headset may include a mechanical housing and/or frame portion in addition to various parts to hold, arrange, position, and assemble the various components of the display system 100. The headset also may include one or more straps, arms, and/or other fasteners to position the headset on the head of a user. By way of non-limiting illustration, headset may include one or more of a head-mounted display (HMD), glasses, googles, and/or other display devices to be installed, mounted, or worn by a user in proximity to eyes and/or head. By way of non-limiting illustration in FIG. 8 shows one example of an HMD, which is described in further detail below.

In some implementations, the one or more light sources 102 may include a plurality of individual point light sources that emit light under control of the one or more processing devices 101. The emitted light may include a ray that travels along an individual axis of propagation from the individual point sources. It is noted that the use of the term "light ray" is not intended to limit the scope of the disclosure to single, discrete, photons, and/or packets of photons. For example, a light ray may include a light beam comprising multiple and continuous photons, in one or more implementations. In some implementations, a light ray may include one or more light waves, where a light wave is defined by one or more of a frequency, a wavelength, an orientation (e.g., of polarization), and/or other features.

In some implementations, one or more light sources 102 may be arranged by the headset to direct light rays toward one or more optical elements 103. For example, a light source 102 may comprise one or more of a microelectromechanical systems (MEMS) RGB laser scanner, a microLED microdisplay, an LED illuminated liquid crystal on silicon (LCOS), an LED/RGB laser illuminated liquid crystal on silicon (LCOS), a digital light projector (DLP), a digital micromirror device (DMD), a liquid crystal display (LCD), an organic light-emitting diode (OLED) display, an OLED microdisplay, and/or other light sources. In some implementations, as discussed in further detail below, at least two light sources 102 are provided (e.g., at least one light source for each eye) to provide a binocular or stereographic vision display system.

In some implementations, a light source 102 may generate light rays based on one or more color parameters of the light rays. Color parameters may include one or more of a first color parameter, a second color parameter, a third color parameter, and/or other color parameters. A value of a first color parameter may specify one or more of a luminous intensity, a chromaticity, a brightness, and/or other attributes of a first color. A value of a second color parameter may specify one or more of a luminous intensity, a chromaticity, a brightness, and/or other attributes of a second color. A value of a third color parameter may specify one or more of a luminous intensity, a chromaticity, a brightness, and/or other attributes of a third color. By way of non-limiting illustration, the first color may be red, the second color may be green, and/or the third color may be blue.

In some implementations, one or more optical elements 103 may be arranged by the headset such that when the headset is positioned on the head of the user, light rays generated by the one or more light sources 102 are projected onto the one or more optical elements 103 and reflected or partially reflected to the eyes of the user to form images of virtual content. In some implementations, light rays from the ambient environment surrounding the user propagating toward the one or more optical elements may be transmitted through the one or more optical elements. The ambient light rays and light rays reflected from the one or more optical elements are combined to form cumulative light rays that are perceived by one or more eyes of the user as images. As a result, images of virtual content appear or are perceived by the user as being superimposed over the user's view of the real world through the one or more optical elements 103 to create an augmented reality environment. In some implementations, as discussed in further detail below, at least two optical elements 103 are provided (e.g., at least one for each eye) to provide a binocular or stereographic vision display system. The optical elements 103 may be formed as part of glasses, goggles, or embodied as image areas or apertures within a single element (e.g., a visor) positioned for viewing by the eyes of a user.

In some implementations, as previously mentioned, the optical elements 103 may be implemented by or incorporated in a single element, such as a visor. The visor may comprise a curved and/or freeform surface structure and/or may have other shapes and/or forms. In some implementations, a curved visor may have one or more of a concave side surface, a convex side surface, a peripheral side edge, a freeform surface, and/or other features and surfaces. In some implementations, the visor is adapted to be mounted, attached, affixed, or otherwise secured to the headset by any of the known mechanical means, so that the geometrical relationship between the wearer of the headset and the visor is maintained substantially constant. While the visor may be constructed of any transparent material which has an inner surface with significant reflectivity and has sufficient transmissivity to allow the visor to function as an optical combiner, the visor constructed in accordance with the, following examples, includes at least the two decentered off-axis apertures located on predetermined portions of the visor surface in front of each eye of the user. In order to minimize see-through distortions and to provide a pleasing visor shape, each aperture is blended on all of its sides into a complex, but smoothly varying form as detailed herein. This form, although continuous and defined, has no simple closed form of mathematical expression, and one skilled in the art will appreciate that the following description primarily describes the formation of the aperture's surfaces, for example, the two decentered off-axis curved or freeform surfaces of the optical element 103. The surface segments bounding these two apertures can be any other curved surface that fits the goals of the overall visor design.

The visor may be formed from one or more transparent optical plastics and/or other materials. A visor may be injection-molded and/or formed by other techniques. The visor material may have a low birefringence, and low thermal/stress induced birefringence (such as provided by acrylic optical plastic) to avoid a rainbow effect under cross-polarizers. By way of non-limiting illustration, a visor may comprise one or more of ZEONEX, Cyclo Olefin Polymer (COP), Cyclic Olefin Copolymer (COC), polycarbonate, Poly (methyl methacrylate) (PMMA), and/or other materials. A visor may include at least two optical elements 103. The optical elements 103 may be described as apertures through which the user views their environment. As described below, the interior surface of the visor corresponding to the apertures may have a specifically defined shape, curvature, and/or prescription selected to reflect light from the source 102 to the eyes of user and present virtual content with a field of view (FOV) of the user. The interior portions of the visor defining the apertures and exterior surface of the visor may have one or more coatings, films, laminates, or other structures to provide various visual properties with respect to light from a source 102 and/or the user's environment. For example, the interior surface may include one or more coating, films, laminates, or other structure that reflect or partially reflect light from the light source 102 while allowing light from the user's environment to pass through the aperture to the user's eye. Broad band anti-reflection coatings may be deposited on the outer surface of the visor.

In some implementations, the light rays may be polarized, and a reflective polarizer may be deposited on, or comprise at least part of, the surface of the visor. A reflective polarizer may have high-polarization reflectivity over a broad spectrum and/or over a wide angle. A reflective polarizer may have a reflectivity of 80-100% and/or other ranges. By way of non-limiting illustration, a reflective polarizer may have a reflectivity of 90% and/or other values. A reflective polarizer may be one or more of laminated onto a visor surface, deposited onto a visor surface, self-assembled onto a visor surface, inject-molded onto a visor surface during fabrication of the visor, and/or formed in other ways. A reflective polarizer may comprise one or more of a coating, a film, a laminate, one or more of these, and/or other structures. A reflective polarizer may comprise one or more of a multi-layer birefringent film, a metal nano-wire film made by nano-printing and/or nano-lithography methods, a self-assembled metal nanowire film, and/or other structures. A detailed description of such an assembly is described in U.S. patent application Ser. No. 15/392,683, filed Dec. 28, 2016, which is hereby incorporated by reference in its entirety for all purposes.

For reference purposes, FIGS. 2, 3, 4, 5, 7A, 7B, 7C, and 8 are described with regard to a standard orthogonal x, y, z Cartesian coordinate system of spatial reference. The z-axis is parallel to a line of sight from the eye of the user wearing the headset. The y-axis is vertical, and the x-axis is horizontal for a normal orientation of a user along the line of sight. Accordingly, the x-z plane of reference defines a horizontal plane and the y-z plane of reference defines an orthogonal vertical plane. While the following description is made in terms this spatial reference, other forms of spatial reference, such as a polar coordinate system, are just as valid, and that the following mathematical descriptions may similarly be made in those other reference systems using a transformation function.

Figure 2:
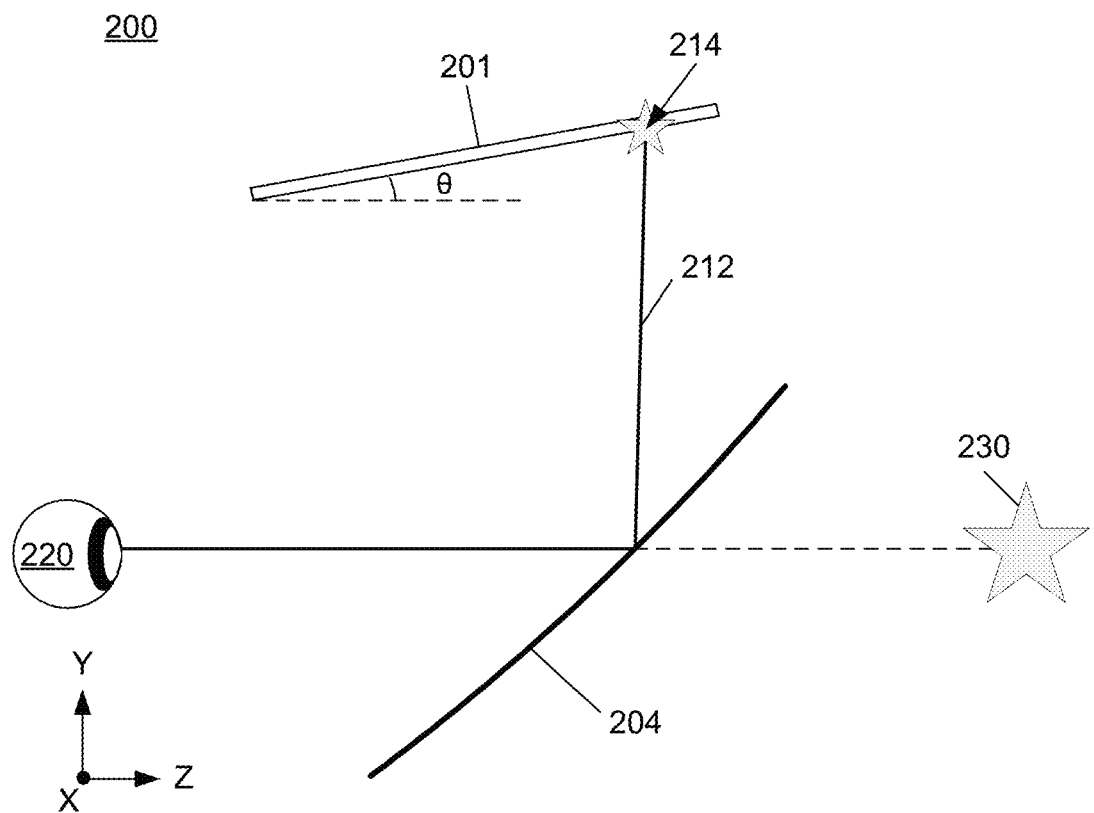
FIG. 2 shows a side view of an example of the arrangement of visual components in an off-axis display system.

By way of non-limiting illustration, FIG. 2 shows a side, cut away view parallel to the y-z plane of one example of the arrangement of the visual components in an off-axis display system for a headset of display system 100. As shown in FIG. 2, the visual components of the display system 200 include a light source 201 and an optical element 204. Although FIG. 2 shows a single light source 201 and optical element 204, it will be appreciated that in a stereoscopic or binocular system at least one of the light source 201 and optical element 204 are provided for each eye of the user; however, the descriptions provided herein also apply to monocular display systems. In some implementations, the light source 201, for example, is a two-dimensional (2-D) panel display that is disposed within a plane perpendicular to the y-z plane of FIG. 2. The intersection of the panel and the and the y-z plane form an acute angle θ, such that the panel display appears titled up and away from the user's line of sight along a line parallel to the z-axis. The light source 201 generates light rays, including light ray 212. The light ray 212 and/or other light rays form images, including image 214, of virtual content that are directed at the optical element 204. The light rays associated with image 214 of virtual content may be reflected by the optical element 204 into a user's eye 220. The light rays of the image 214 entering the user's eye 220 are perceived as superimposed within the user's view of the real world through optical element 204 to create an augmented reality environment. For example, image 214 is projected on the optical element 204 and reflected to the user's eye to create the augmented reality environment such that virtual content 230 (e.g., corresponding to the reflected image 214) may be perceived as being located in the real world according to a focal distance determined by the curvature of the optical element 204 and the distance travelled by the light ray 212 from the light source 201 to the optical element 204.

As shown FIG. 2, the light source 201 (e.g., a 2-D display panel) is tilted at an angle θ with respect to the horizontal or x-z plane out of view of the user's eyes 220 to avoid obscuring view of the real world through the optical element 204. In addition, the optical axis of the system 200 is also arranged at an angle with respect to the horizontal or x-z plane. This arrangement of the visual components results in an off-axis system in which the optical axis of the visual components is not coincident with the mechanical center of the components. For example, the optical axis is along the eye gaze direction (i.e., the z-axis), and the mechanical axis of the optical element is perpendicular to the vertex of the optical element's surface, which forms an angle at its intersection with the horizontal x-z plane.

Figure 3:
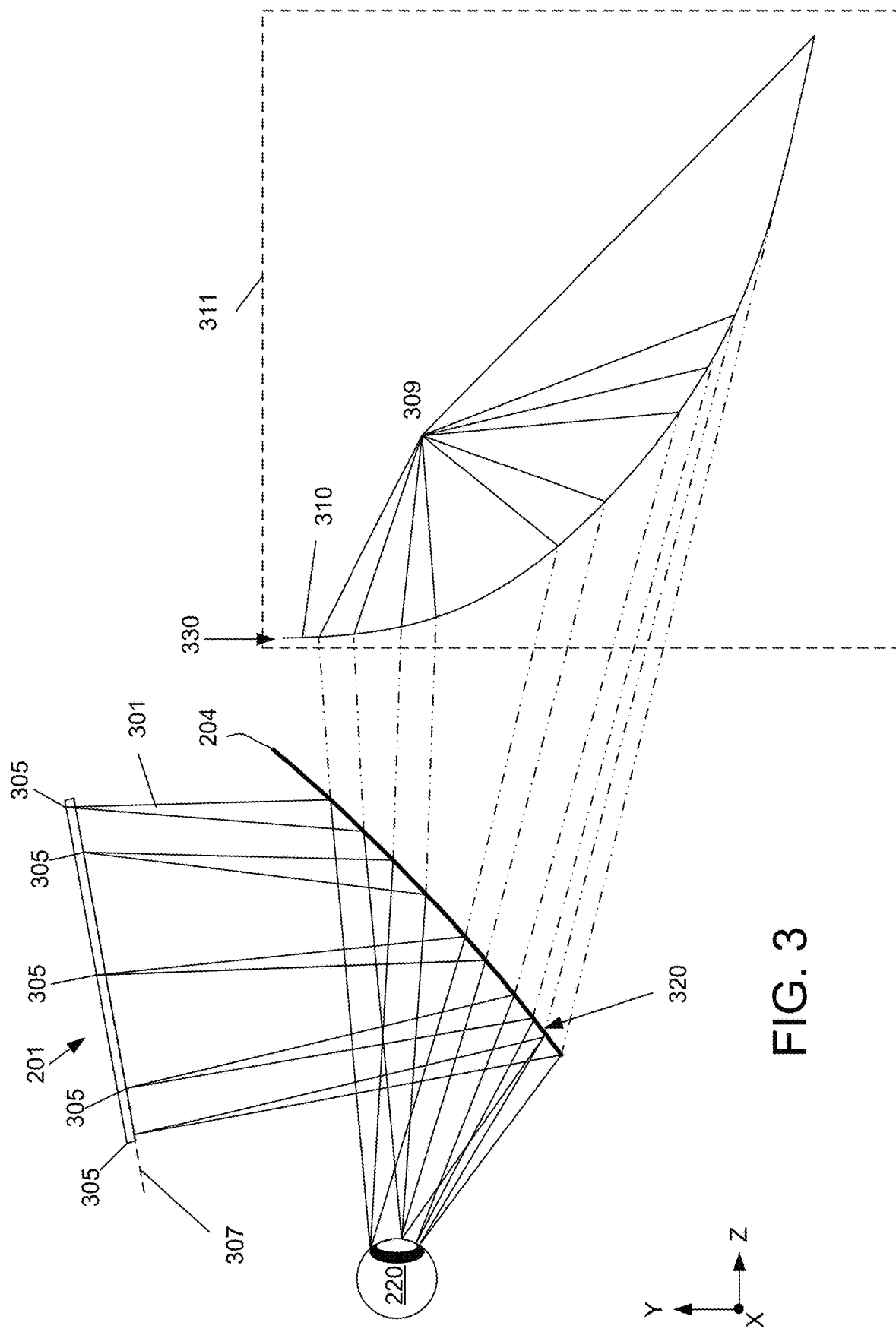
FIG. 3 shows an example of a focal volume generated by an off-axis display system of FIG. 2.

FIG. 3 shows an example of a focal volume generated by the off-axis display system of FIG. 2. As shown in FIG. 3, a side, cut away view in the y-z plane of the arrangement of visual components in an off-axis display system is shown as including the light source 201 and the optical element 204. Light rays 301 from five, point sources 305 along a line 307 formed by the intersection of the y-z plane and the light source 201 are shown reflecting from the optical element 204 to the eye 220 of the user. The light from the rays 301 produced by the point sources of light 305 is perceived by the user as an image at points 309 corresponding to a focal distance along the curve 310.

In one general aspect, human binocular or stereo vision incorporates at least two tightly coupled physiological mechanisms. For example, one of those mechanisms is visual accommodation. Visual accommodation refers to the dynamic change of the curvature of the crystalline lens of the eye that adjusts focus on a plane of depth (e.g., a focal plane) corresponding to, for example, one or more objects of interest (OOI). The crystalline lens of the eye changes curvature as a function of the depth of the gaze of a user. For example, the lines of sight of each eye converge at a convergence point at the OOI upon which the user's gaze is cast in an accommodation plane corresponding to the curvature of the crystalline lens of the eyes. However, as seen in FIG. 3, the perceived image formed by the reflected light source is not located in a focal plane, but rather a significantly curved volume corresponding to curve 310 within a large focal depth range 311. As a result, the arrangement of the components of the display system in FIGS. 2 and 3 introduces challenges to the eye's visual accommodation. For example, within a typical high acuity FOV of the eyes 220 of a user, rapid change of focal distance associated with movement of the user's gaze within the FOV may confuse the brain as to where to guide the eyes to focus. In addition, as the user's gaze approaches the bottom portion 320 of the optical element 204 (e.g., an outer portion of the surface of the aperture closest to the eye), the curve 310 or focal volume approaches infinity. However, this may not be desirable for interactive virtual content produced by the vision system for this portion of the focal volume when a headset provides interactive virtual content, which should be perceived as being located within reach of the user.

In addition, as shown in FIG. 3, if the closest focal distance 330 for a portion of the focal volume, for example, corresponding to the point sources furthest from the user's eye (e.g., along the "top" edge of the display) is perceived as within a certain minimal distance (e.g., less than 0.4 meters), gazing at this portion of the focal volume may cause noticeable eye-stress. For example, as users age, their eyes may no longer have the muscle strength to change the shape of their crystalline lens to focus on objects less than approximately 0.4 meters way. Therefore, any images perceived at a focal distance closer than this will introduce noticeable eye-stress, discomfort, or blurring for the user.

In order to minimize, reduce, eliminate and/or overcome these causes of stress thereby providing a comfortable and immersive VR or AR experience for the user, a virtual image of an object of interest should be perceived by the user as located in focal plane instead of the focal curve or volume shown in FIG. 3. Although the off-axis nature of the display system results in a focal plane that is tilted; the edge boundaries of the plane (e.g., corresponding to the nearest and farthest points sources of the light source) may be located within a perceived focal range that does not induce eye strain, discomfort, disorientation, and/or blurring, and is within a distance suitable for interaction by the user (or as replacement of a user's physical display). In some implementations, the range of focal distance is perceived as being located between a 0.4-meter and a 1.1-meter depth from the user.

Figure 4:
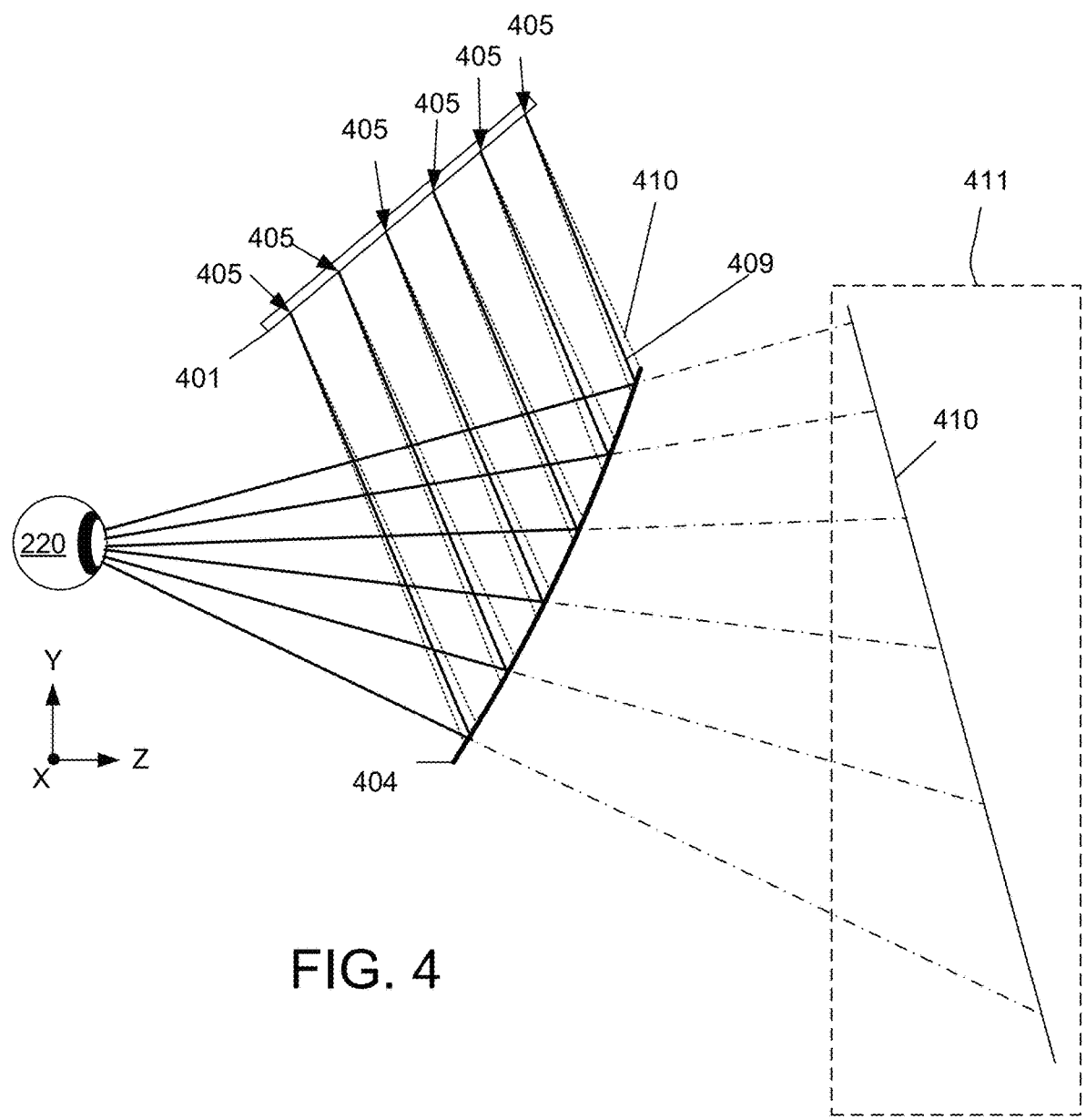
FIG. 4 shows an example of a telecentric off-axis display system.

FIG. 4 shows an example of the arrangement of components in a telecentric off-axis display system 400 providing a perceived virtual image within a focal plane for comfortable visual accommodation by a user. As shown in FIG. 4, a side, cut away view in the y-z plane of the display system includes a light source 401 and optical element 404. To reduce focal distance variation of light from the light source 401 and to focus any perceived image of virtual content within a focal plane at desired range of depth, the visual components of the display system are specifically positioned and oriented in conjunction with selection of the surface shape of the reflecting surface of the optical element 404 to maximize the telecentricity of the light rays from the light source 401 that are reflected and perceived by the eyes 220 of the user.

As shown in FIG. 4, each point light source 405 emits many rays of light 410. For example, in some implementations, each pixel on a display panel emits many light rays in a diverging manner; however, due to the limited size of the eye's pupil, only a small sized, cylindrical beam or bundle of light rays reflected from each pixel reaches the eye to form a point image on the user's retina. As described herein, the orientation of the light source 401 and optical element 404 in conjunction with the shape of a reflecting surface of the optical element 404 are selected such that only the ray bundles emitted from the light source 401 whose center rays 409 (also known as chief rays) are substantially parallel to each other are reflected by the optical component 404 and viewed by the eyes 220 of the user. This precise arrangement and selection of components reduces or eliminates any non-parallelism of the center rays viewed by the user from each point light source 405. The resulting image formed on the retina of the user's eyes 220 is perceived as being formed in a focal plane 410 within the desired focal depth range 411. The focal plane 410 is tilted because of the off-axis nature of the vision system; however, the edge boundaries of the plane (e.g., corresponding to the nearest and farthest points sources 405 of the light source 401) are located within a perceived range of focal distances that does not induce eye strain and are within a distance suitable for interaction by the user. In some implementations, this range is between 0.4 m and 1.1 m.

Figure 5:
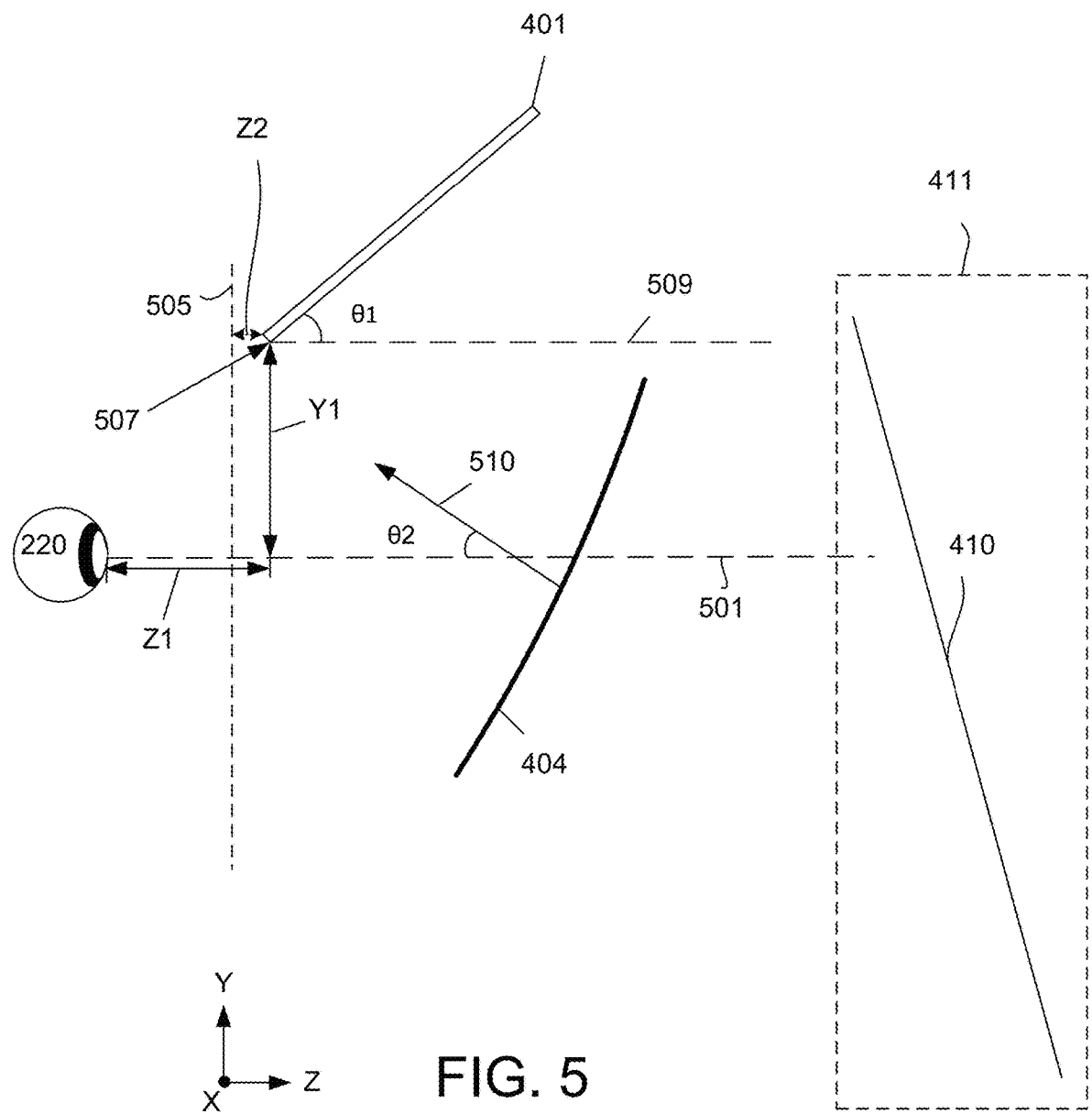
FIG. 5 illustrates geometries of the telecentric off-axis display system of FIG. 4.

FIG. 5 illustrates the geometries used to provide the telecentric off-axis display system of FIG. 4. As shown in FIG. 5, a side, cut away view in the y-z plane of the display system includes a light source 401 and optical element 404. One example of a user's gaze is modeled by line 501 parallel to the z-axis. Line 505 perpendicular to the gaze line 501 and parallel to the y-axis approximately corresponds to the average location of a user's forehead (not shown). In the example shown in FIG. 5, the light source 401 is a 2-D panel display located in a plane perpendicular to the y-z plane. The light source includes four edges bounding the display including a base or bottom edge 507 that positioned closest and approximately parallel to a user's forehead. The bottom edge 507 of the light source 401 is located along a line perpendicular to the y-z plane at a distance $z_1$ from the user's eye along the gaze line 501 and at a distance $y_1$ above the gaze line 501 (and/or a distance $z_2$ from the line 505). The light source 401 is tilted up and away from the user's gaze (i.e., pivoting about the edge 507) at an angle of $\theta_1$ formed between the plane of the light source and a line 509 parallel to the z-axis the gaze line 501 and intersecting the bottom edge 507 of the light source 401. In addition, the vertex 510 of the optical element 404 in the y-z plane is tilted at an angle $\theta_2$ formed by the vertex and the gaze line 501. The shape, curvatures, and/or prescription of the reflective surface of the interior the optical element of the aperture is specified. Examples of surface shapes include bi-conic, bi-conic Zernike, extended polynomial surface, or more general free form surfaces. For example, the surface shape C of the optical element may be described by a free form curve having a base radius r and its surface local sag. In some implementations, the reflective surface of the aperture is freeform defined by base curvatures in y-z plane and x-z plane in addition to other polynomial terms that add to the local sag (e.g., the sag at the point the ray intersects the reflective surface).

Figure 6:
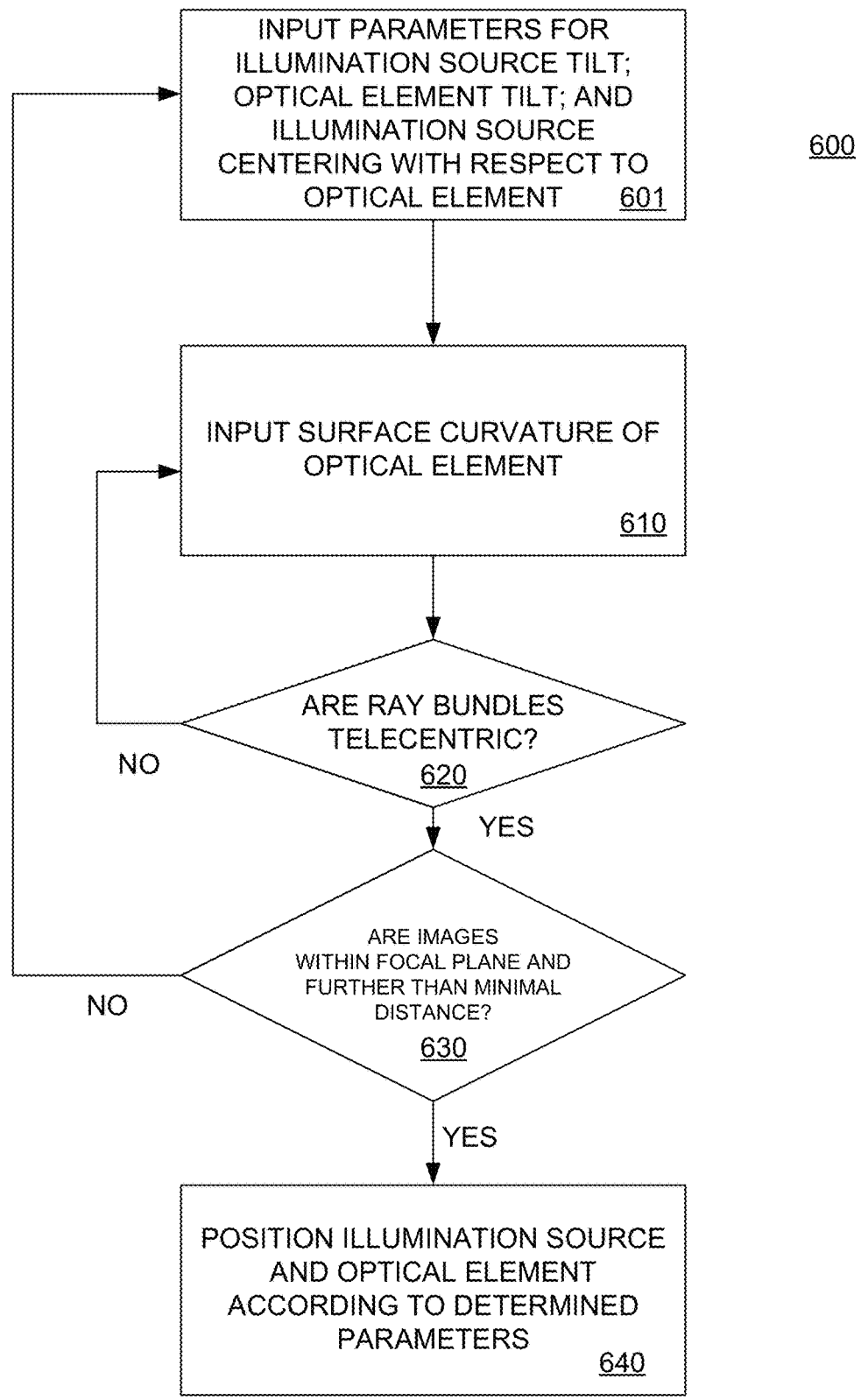
FIG. 6 shows an example of a process for optimization of an off-axis display system.

FIG. 6 shows an example of a process for optimization of the design an off-axis display system. According to process shown in FIG. 6, given a structure and orientation of the light source and the optical element, selection of the angles $\theta_1$ and $\theta_2$ in addition to the surface curvature C of the optical visor are determined, in order to optimize the telecentricity of the ray bundles emitted from the light source and viewed by the user after reflection from the optical element. According to the process 600 optimal telecentricity is determined when the degrees of non-parallelism of the chief rays of each bundle approach zero. In one example, the process 600 uses a merit function to determine parallelism of the chief rays at the adjacent point sources of light (e.g., pixels of a display panel) by adjusting the light source tilt, optical element tilt, and reflective surface shape of the optical element. A global minimum of the merit function provides telecentricity and results in a flat focal plane at a desired focal distance range.

The arrangement of components (e.g., the light source and optical element) may be modelled using a computer aided design (CAD) program in which the location of the components of the vision system, such as, for example, the display and visor are precisely know with respect to a CAD origin. For example, base arrangements of components using the mechanical limitations (i.e., eye to visor nominal distance, panel center to visor center distance) are predetermined and known to the CAD system. Light emitted by the points of the display also may be modelled or measured using the CAD software. Using a recursive algorithm, the optimal positioning of these components elements may be determined such that the telecentricity of the system is maximized and the focal distance range is met.

For example, according to operation 601, parameters for the merit function are input, including light source tilt, optical element tilt, and the light source centering with respect to the optical element.

In operation 610, the surface local sag (surface curvature together with polynomial addition to the base curve—surface local Sag) of the optical element is input.

In operation 620, the process determines whether the ray bundles are telecentric. CAD software (e.g., Zemax or Code V) determine the chief ray angle of the ray bundle emitted from each adjacent point source of the light source (e.g., pixels of the 2D panel display) based on sampled locations of the point sources with reference to CAD local coordinate system. A simple subtraction of the angles across several field points are taken. The summation of the residual of the angles indicates the level of telecentricity (e.g., the smaller the residual value the better). When the summation is at its minimum, optimal telecentricity it reached. If not, the process repeats operations 601, 610, and 620 with new parameters and/or surface shape. If the ray bundles are telecentric, the process proceeds to operation 630.

In operation 630, the process determines whether the focal plane is within the desired minimum and maximum desired focal range. If not, the process repeats operations 601, 610, 620, and 630 with new parameters and/or surface shape (i.e., surface radius of curvature and its local Sag). If the criteria for the desired minimum and maximum focal range are met, in operation 640 the visual components are arranged according to the determined design parameters $\theta_1$, $\theta_2$, and C.

Figure 7A:
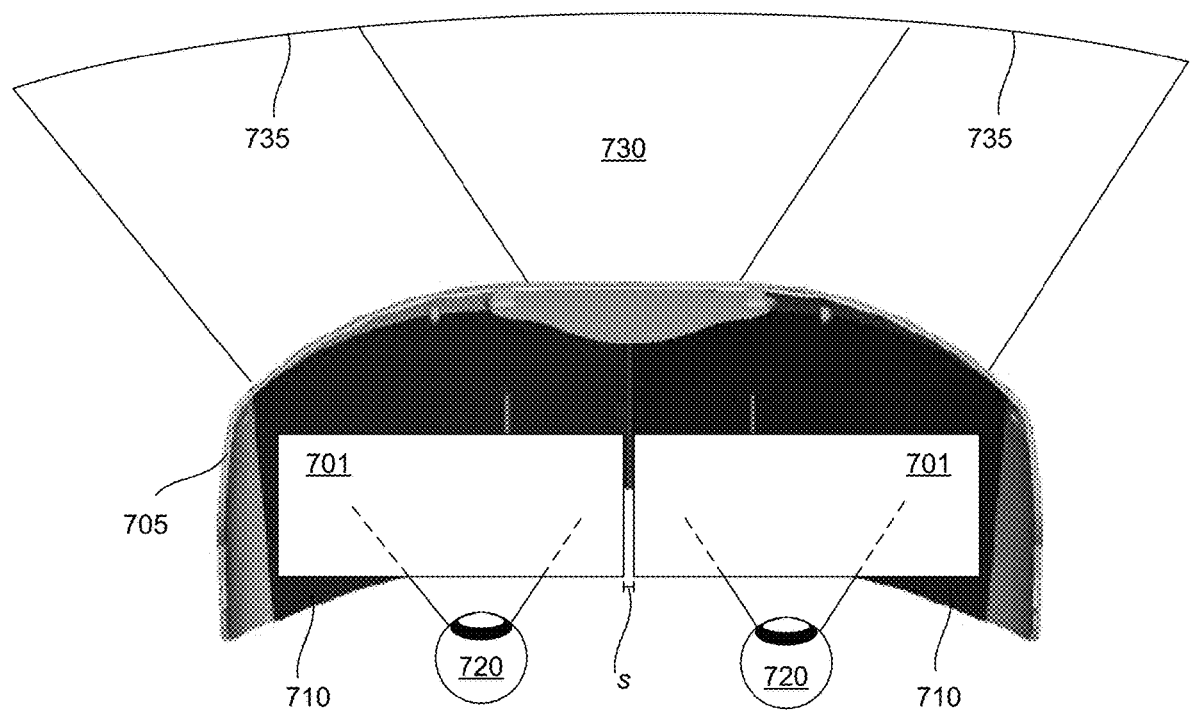
FIGS. 7A, 7B, and 7C show a top view, a side view, and a front view of one example of an implementation of the visual components of an off axis visual system.
Figure 7B:
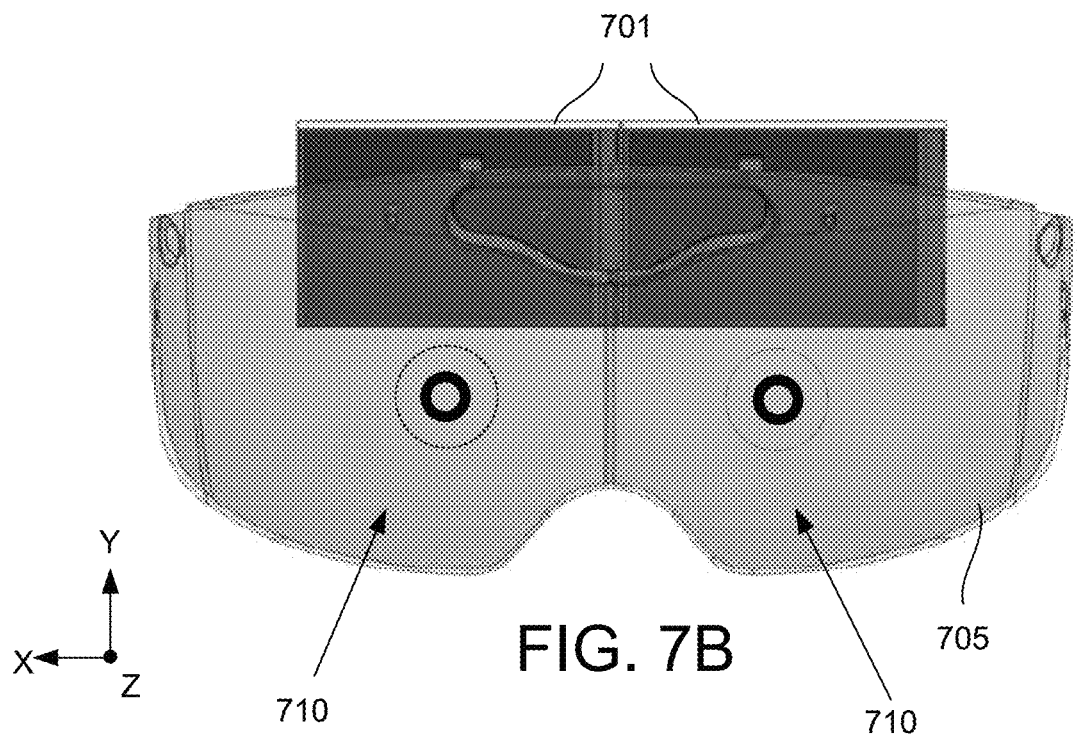
Figure 7C:
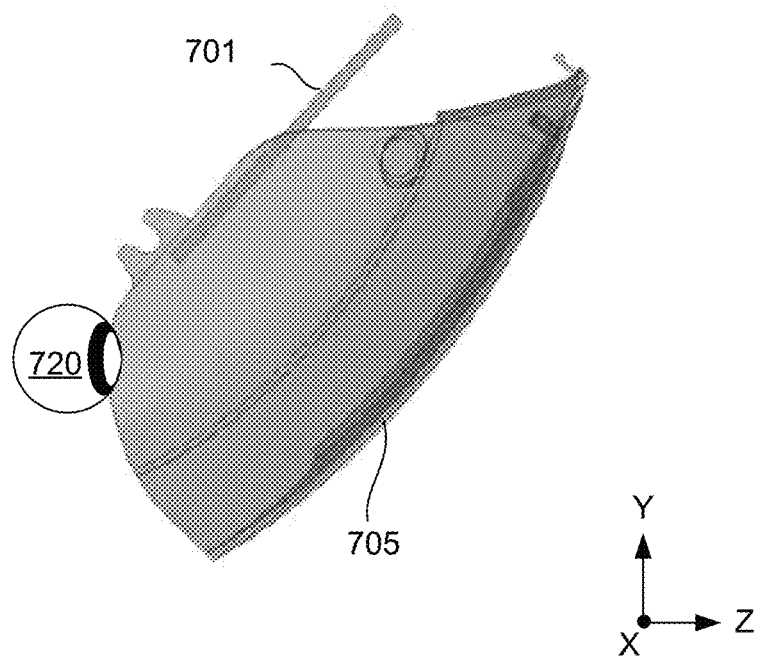

FIGS. 7A, 7B, and 7C show a top view, a front view, and a side view, respectively, of an example of the visual components of a display system with optimized telecentricity, focal depth, and wide FOV. As shown in FIGS. 7A, 7B, and 7C, the display system 700 includes two light sources, such as, for example, 2-D display panels 701 and a visor 705. The visor 705 includes two optical elements, such as, for example, image reflection areas 710, or apertures on the interior surface of the visor 705. The apertures or image reflection areas 710 define a portion of the surface that reflect light from a display panel 701 to a respective eye 720 of the user, while allowing light from the surrounding user environment to travel through the visor apertures to the user's eyes 720. The center of the display panels 701 are centered on the image reflection areas 710 of the visor 705.

In some implementations, to provide a larger horizontal FOV similar to the horizontal FOV of the human eye FOV, two display panels 701 are used. The display panels 701 are arranged or positioned within the same 2-D plane separated by a distance s. By varying and/or adjusting the separation s between the two display panels, a tradeoff between the overlapping stereo portion 730 of the FOV and the large monocular peripheral total FOV 735 is achieved. For an immersive AR experience, a total horizontal FOV approximating or matching the FOV of the human eyes is desirable (e.g., approximately 120 degrees horizontally). As the separation s between the two displays increases, the peripheral FOV increases and stereo FOV decreases. When the separation s>=user's inter-pupillary distance (IPD), stereo vision is not possible. Therefore, in some implementations, the maximum separation s should be <=63 mm the mean value of IPD for humans.

In one example, the display panels 701 may be implemented using 3.5" LCD panels and with a visor width matching the mean size of human foreheads. In this example, separation s is selected between 20-16 mm, for a balance of approximate 50 degrees stereo FOV and 118-degree overall FOV. In addition, as shown in FIGS. 7A, 7B, and 7C, $\theta_1$ may be substantially 38 degrees, $\theta_2$ may be substantially 43 degrees, the surface of the apertures is freeform with a surface radius of the curvature in the y-z direction is substantially 173 mm and the surface radius of the curvature in the x-z direction is substantially 118 mm.

FIG. 8 shows a perspective view of an example of a head mounted display system 800 incorporating the visual components of the off-axis visual system, such as the displays, visor, and image reflection areas. A housing 801 positions the displays (not shown) and visor 805. In addition, straps 802 are attached to the housing 801 to position and hold the HMD 800 on a user's head such that the user's eyes can comfortably view the image reflection areas on the interior surface of the visor 805. In addition, an adjustment mechanism 810 is provided to position and secure the HMD on the head of a user.

Returning to FIG. 1, in some implementations, one or more sensors 105 are provided to measure data of the user environment. The data is used by vision algorithms to locate virtual objects within the environment and to provide user interaction with the environment (e.g., by determining hand positions and gestures with relation to the location of the perceived location of the virtual objects. Examples of sensors 105 include one or more of monochrome cameras, an RGB camera, a depth sensor, an inertial measurement unit, and a thermal sensor.

One or more physical processing devices 101 or processor(s) may execute machine-readable instructions to implement processes and operations embodied by applications and software, to process data, and to render or display content. Executing machine-readable instructions may cause one or more physical processors 101 to facilitate providing an interactive environment, such as one or both of an augmented reality environment and/or a virtual reality environment. The machine-readable instructions may include one or more of a content component and/or other components.

In some implementations, content component may be configured to determine virtual content to present to a user. Virtual content may include one or more virtual objects and/or other virtual content. Virtual content may be in the form of digital imagery rendered and generated by one or more light sources 102.

In some implementations, content component may be configured to control individual ones of one or more light sources 102.

In some implementations, controlling one or more light sources 102 and/or other components of system 100 may cause light rays to reflect off an optical element 104 into a user's eye(s), wherein the user may perceive virtual content as located within a three-dimensional space in their field-of-view of the real world as described above.

In some implementations, one or more of processor(s) 101, one or more light sources 102, external resources 118, and/or other components may be operatively linked via one or more electronic communication links. For example, such electronic communication links may be established, at least in part, via network(s) that communicate with interface 110. Interface 110 may be a combination of hardware and software that allow various components of the system 100 to communicate with processor(s) 101. Network(s) may comprise one or both of wired or wireless communications. It will be appreciated that this is not intended to be limiting and that the scope of this disclosure includes implementations in which processor(s) 101, one or more light sources 102, external resources 118, and/or other components may be operatively linked via some other communication media.

The external resources 118 may include sources of information, hosts, external entities participating with system 100, providers of virtual content, and/or other resources. In some implementations, some or all the functionality attributed herein to external resources 118 may be provided by resources included in headset 102.

The processor(s) 101 may include and/or have access to electronic storage 104, and/or other components. The processor(s) 101 may include communication lines or ports to enable the exchange of information with the interface 110 and a network and/or other components of system 100. Illustration of processor(s) 101 in FIG. 1 is not intended to be limiting. The processor(s) 101 may include a plurality of hardware, software, and/or firmware components operating together to provide the functionality attributed herein to processor(s) 101. For example, processor(s) 101 may be implemented by a cloud of computing platforms operating together as processor(s) 101.

Electronic storage device 104 may comprise non-transitory electronic storage media that electronically stores information in a physical medium. The electronic storage media of electronic storage 104 may include one or both of system storage that is provided integrally (i.e., substantially non-removable) with processor(s) 101 and/or removable storage that is removably connectable to processor(s) 101 via, for example, a port or a drive. A port may include a USB port, a firewire port, and/or other port. A drive may include a disk drive and/or other drive. Electronic storage 104 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 104 may include one or more virtual storage resources (e.g., cloud storage, a virtual private network, and/or other virtual storage resources). Electronic storage 104 may store software algorithms, information determined by processor(s) 101, information received from other components of system 100, and/or other information that enables processor(s) 101 to function as described herein.

Processor(s) 101 is configured to provide information-processing capabilities. As such, processor(s) 101 may include one or more of a digital processor, an analog processor, and a digital circuit designed to process information, an analog circuit designed to process information, a state machine, and/or other mechanisms for electronically processing information. Although processor(s) 101 is shown in FIG. 1 as a single entity, this is for illustrative purposes only. In some implementations, processor(s) 101 may include one or more processing units. These processing units may be physically located within the same device, or processor(s) 101 may represent processing functionality of a plurality of devices operating in coordination. The processor 101 may be configured to execute component and/or other components. Processor(s) 101 may be configured to execute component and/or other components by software; hardware; firmware; some combination of software, hardware, and/or firmware; and/or other mechanisms for configuring processing capabilities on processor(s) 101.

It should be appreciated that although component and/or other components are illustrated in FIG. 1 as being co-located within a single processing unit, in implementations in which processor(s) 101 includes multiple processing units, one or more of components may be located remotely from the other components. The description of the functionality provided by an individual component is for illustrative purposes and is not intended to be limiting, as a given component may provide functionality than is described. For example, a given component may be eliminated, and some or all its functionality may be provided by another component. As another example, processor(s) 101 may be configured to execute one or more additional components that may perform some or all the functionality attributed to one of component.

The system 100 may include various other components including various optical devices and frames or other structure for positioning or mounting the display system on a user allowing a user to wear the display system while providing a comfortable viewing experience for a user. The display system may include one or more additional components, such as, for example, one or more power devices or connections to power devices to power various system components, one or more controllers/drivers for operating system components, one or more output devices 107 (such as a speaker), and one or more input devices 106.

The preceding detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described above are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims, which expressly states otherwise. It is understood that "at least one" is equivalent to "a."

The aspects (examples, alterations, modifications, options, variations, embodiments, and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments that are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. An off-axis vision display system comprising:
   at least one light source configured to emit light, the at least one light source titled at a first angle $\theta_1$ relative to the optical axis of the display system; and
   at least one optical element whose vertex is tilted at a second angle $\theta_2$ relative to the optical axis of the display system having a reflective or partially reflective surface with a specified shape C that is arranged relative to the light source to receive light emitted directly from the at least one light source without any intervening elements between the at least one light source and the at least one optical element that affect a path of travel of the emitted light, and to reflect the emitted light at a corresponding eye of a user of the vision display system, where the reflected light is perceived by the user as a virtual image located in a focal plane, wherein
   the first angle $\theta_1$, the second angle $\theta_2$, and the shape C are selected to provide substantially telecentric light for viewing by the user.

2. The display system of claim 1, wherein the at least one light source includes a plurality of point sources of light configured to provide an image, each point source emitting ray bundles including a center ray, wherein only the ray bundles emitted from the light source whose center rays are substantially parallel to each other are reflected by the at least one optical element and viewed by the user.

3. The display system of claim 2, wherein the image is perceived by a user of the vision display system as a virtual object within the focal plane.

4. The display system of claim 1, wherein the focal plane provides a virtual image that is perceived to appear at focal distances greater than 0.4 meters and less than 1.1 meters.

5. The display system of claim 1, wherein the vision system comprises two light sources and two optical elements wherein each light source is paired with a corresponding one of the two optical elements, and each pair are positioned by the system corresponding to an eye of a user to provide a stereoscopic vision system wherein substantially telecentric light is presented for viewing by the user of the stereoscopic vision system.

6. The display system of claim 5, wherein each light source is a two-dimensional (2-D) panel display and each optical element is located on a portion of an interior surface of a visor of the vision display system facing the user.

7. The display system of claim 1, wherein the shape C of the surface is one of bi-conic, bi-conic Zernike, extended polynomial, or freeform.

8. The display system of claim 1, wherein the vision display system comprises a virtual reality headset configured to be worn on the head of a user.

9. The display system of claim 1, wherein the vision display system comprises an augmented reality headset configured to be worn on the head of a user.

10. The display system of claim 1, wherein the optical axis of the display system is the intersection of a first coordinate plane of the display system and a second coordinate plane of the display system orthogonal to the first coordinate plane, and the at least one light source is a display having a light emitting surface located in a plane substantially orthogonal to first coordinate plane, where the angle $\theta_1$ is formed between the plane of the display light emitting surface and the second coordinate plane, and the angle $\theta_2$ is formed between the vertex of the at least one optical element in the first coordinate plane and the optical axis of the display system.

11. The display system of claim 10, wherein the light emitting display surface includes a plurality of point sources of light configured to provide an image, each point source emitting ray bundles including a center ray, wherein only the ray bundles emitted from the light source whose center rays are substantially parallel to each other are reflected by the at least one optical element and viewed by the user.

12. The display system of claim 10, wherein the display system comprises two light sources and two optical elements wherein each light source is paired with a corresponding one of the two optical elements, and each pair are positioned by the system corresponding to an eye of a user to provide a stereoscopic vision display system wherein substantially telecentric light is presented for viewing by the user of the stereoscopic vision display system.

13. The display system of claim 12, wherein each light source is a two-dimensional (2-D) panel display and each optical element is located on a portion of an interior surface of a visor of the vision display system facing the user.

14. The display system of claim 10, wherein the shape C of the surface is one of bi-conic, bi-conic Zernike, extended polynomial, or freeform.

15. The display system of claim 10, wherein the vision display system comprises a virtual reality headset configured to be worn on the head of a user.

16. The display system of claim 10, wherein the vision display system comprises an augmented reality headset configured to be worn on the head of a user.

17. The display system of claim 12, wherein the two light emitting display surfaces are formed in the display plane and separated in the display plane by distance s, wherein s less than or equal to an inter-pupillary distance of the user.

18. The display system of claim 12, wherein the two light emitting display surfaces are formed in the display plane and separated in the display plane by distance s, wherein s less than or equal to a mean inter-pupillary distance of humans.

19. The display system of claim 10, wherein $\theta_1$ and $\theta_2$ are acute angles.

* * * * *